US008948572B2

(12) United States Patent
Scherlis et al.

(10) Patent No.: US 8,948,572 B2
(45) Date of Patent: *Feb. 3, 2015

(54) SYSTEMS AND METHODS FOR GENERATING A COMPOSITE VIDEO BASED ON A PLURALITY OF VIDEO STREAMS USING A FRAME SCHEDULAR

(71) Applicant: Carnegie Mellon University, Pittsburgh, PA (US)

(72) Inventors: William L. Scherlis, Pittsburgh, PA (US); Eric Burns, Seattle, WA (US)

(73) Assignee: Carnegie Mellon University, Pittsburgh, PA (US)

(*) Notice: Subject to any disclaimer, the term of this patent is extended or adjusted under 35 U.S.C. 154(b) by 19 days.

This patent is subject to a terminal disclaimer.

(21) Appl. No.: 13/667,654

(22) Filed: Nov. 2, 2012

(65) Prior Publication Data
US 2013/0071091 A1   Mar. 21, 2013

Related U.S. Application Data

(63) Continuation of application No. 11/489,840, filed on Jul. 20, 2006, now Pat. No. 8,306,396.

(51) Int. Cl.
*H04N 5/93* (2006.01)
*G11B 27/00* (2006.01)
*G11B 27/034* (2006.01)
*G11B 27/11* (2006.01)

(52) U.S. Cl.
CPC .............. *H04N 5/93* (2013.01); *G11B 27/034* (2013.01); *G11B 27/11* (2013.01)
USPC ........................................ 386/278

(58) Field of Classification Search
CPC .......... G11B 27/034; G11B 27/11; H04N 5/93
USPC ............................................ 348/46
See application file for complete search history.

(56) References Cited

U.S. PATENT DOCUMENTS

| | | | |
|---|---|---|---|
| 5,966,121 A | 10/1999 | Hubbell et al. |
| 6,016,150 A | 1/2000 | Lengyel et al. |
| 6,154,601 A | 11/2000 | Yaegashi et al. |
| 6,356,708 B1 | 3/2002 | Krause et al. |

(Continued)

OTHER PUBLICATIONS

Ahmed, Sameer; Using the DirectShow Video Mixing Renderer 9 Filter; The Code Project; Jan. 3, 2005.

(Continued)

*Primary Examiner* — Jessica M Prince
(74) *Attorney, Agent, or Firm* — Jones Day (57) ABSTRACT

A system for video compositing is comprised of a storage device for storing a composite timeline file. A timeline manager reads rendering instructions and compositing instructions from the stored file. A plurality of filter graphs, each receiving one of a plurality of video streams, renders frames therefrom in response to the rendering instructions. 3D hardware is responsive to the rendered frames and the compositing instructions for creating a composite image. A frame scheduler is responsive to the plurality of filter graphs for controlling the frequency at which the 3D hardware creates a new composite image. An output is provided for displaying the composite image. Methods of generating a composite work and methods of generating the timeline file are also disclosed. Because of the rules governing abstracts, this Abstract should not be used to construe the claims.

15 Claims, 3 Drawing Sheets

(56) References Cited

U.S. PATENT DOCUMENTS

| | | |
|---|---|---|
| 6,542,198 B1 * | 4/2003 | Hung et al. ................. 348/459 |
| 6,542,692 B1 | 4/2003 | Houskeeper |
| 6,580,869 B1 | 6/2003 | Ando et al. |
| 6,590,603 B2 | 7/2003 | Sheldon et al. |
| RE38,609 E | 10/2004 | Chen et al. |
| 7,757,240 B2 * | 7/2010 | Miller et al. ................. 719/312 |
| 7,801,409 B2 | 9/2010 | Howell et al. |
| 7,805,678 B1 | 9/2010 | Niles et al. |
| 8,169,345 B2 * | 5/2012 | Evans et al. ................. 341/61 |
| 2002/0018124 A1 | 2/2002 | Mottur et al. |
| 2002/0069218 A1 | 6/2002 | Sull et al. |
| 2002/0097257 A1 | 7/2002 | Miller |
| 2003/0041109 A1 | 2/2003 | Meloni et al. |
| 2003/0140178 A1 * | 7/2003 | Evans ......................... 709/318 |
| 2003/0233661 A1 | 12/2003 | Fisher et al. |
| 2004/0117730 A1 | 6/2004 | Ibrahim et al. |
| 2004/0205811 A1 | 10/2004 | Grandy et al. |
| 2004/0240541 A1 | 12/2004 | Chadwick et al. |
| 2005/0100316 A1 * | 5/2005 | Miller et al. ................. 386/52 |
| 2005/0246752 A1 | 11/2005 | Liwerant et al. |
| 2008/0037959 A1 | 2/2008 | Hatano |

OTHER PUBLICATIONS

Geraint Davies Consulting, Ltd.; DirectShow Filters; 1999.
Geraint Davies Consulting, Ltd.; WDM Streaming; 2000.
Geraint Davies Consulting, Ltd.; Building Filter Graphs; 1999.
International Search Report and Written Opinion of the International Searching Authority; PCT/US07/017168; Mar. 2008.
Jumpcut Website; 1998.
Kamara, Sheila; JavuNetwork: Remote Video Production and Storage; IEEE Multimedia at Work; pp. 78-80; 1999.
Library of Congress; Video Viewer—Additional Playback Information; 1999.
Rutledge, Lloyd; SMIL 2.0: XML for Web Multimedia; IEEE Internet Computing, 5(5); pp. 78-84; 2001.
Vedula, Sundar; Image Based Spatio-Temporal Modeling and View Interpolation of Dynamic Events; Submitted in partial fulfillment of requirements for Degree of Doctor of Philosophy, Carnegie Mellon University; 2001.

* cited by examiner

SYSTEMS AND METHODS FOR GENERATING A COMPOSITE VIDEO BASED ON A PLURALITY OF VIDEO STREAMS USING A FRAME SCHEDULAR

CROSS REFERENCE TO RELATED APPLICATIONS

This patent application is a continuation of U.S. patent application Ser. No. 11/489,840, filed Jul. 20, 2006, and entitled "Hardware-Based, Client-Side, Video Compositing System," the entirety of which is herein incorporated by reference.

BACKGROUND

The present disclosure is generally directed to video editing systems and, more particularly, to a system and method for creating a composite video work.

Traditional non-linear digital video editing systems create output clips frame-by-frame, by reading input clips, performing transformations, rendering titles or effects, and then writing individual frames to an output file. This output file must then be streamed to media consumers.

There are several problems with this approach. First, to splice multiple videos together into an edited video, all video files must be stored locally, and must be of sufficiently high quality that recompression for re-streaming will not result in noticeable quality loss. Second, when the edited video is created, it must be stored in addition to the input clips, and that consumes video space proportional to its length. Creating multiple edits of the same input videos consumes additional storage. This makes mass customization impractical. Third, when the input videos are composited to create the output video, every frame of the output must be rendered at the exact frame size and format of the output video. This requires that input videos using different resolutions, color spaces, and frame-rates be upscaled, downscaled, color-space converted, and/or re-timed to match the output media type. Finally, even if the original videos are available via network streams, delivering the edited output video to a consumer requires that the output video be hosted (served on a network) as well.

There is a technology component in Windows XP® software called the Video Mixing Renderer 9 (VMR9), part of the DirectShow® API. In DirectShow®, all streaming media files are played by constructs called "filter graphs," in which a directed graph is created of several media "filters." For example: This graph might start with a "file reader filter" (or a "network reader filter," in a network streaming case) to define an AVI input stream of bits (from disk or network, respectively). This stream then passes through an AVI splitter filter to convert the AVI format file into a series of raw media streams, followed by a video decoder filter to convert compressed video into uncompressed RGB (or YUV) video buffers, and finally a video renderer to actually draw the video on the screen.

The Microsoft VMR9 is a built-in proprietary video renderer that draws video frames to Direct3D® hardware surfaces. A "surface" is an image that is (typically) stored entirely in ultra-high-performance graphics controller memory, and can be drawn onto one or more triangles as part of a fully hardware-accelerated rendering pipeline. The primary goal of the VMR9 is to allow video to be rendered into these surfaces, then delivered to the application hosting the VMR9's filter graph for inclusion in a Direct3D® rendered scene. The advantage of this approach is that many highly cpu-intensive operations, such as de-interlacing the output video, re-sizing it (using bilinear or bicubic resampling), color correcting it, etc., are all performed virtually for free by modern consumer graphics hardware, and most of these operations are complete before the video surface even becomes available to the application programmer.

The VMR9 has a mode of operation called "mixing mode," in which a small number of video streams can be "mixed," or composited, together at rendering time. The streams can vary in frame size, frame rate, and other media-type parameters. When frames are issued to the renderer by upstream filters (such as the compressed video decoder), it composites the frames together and generates a single Direct3D® surface containing the composite. The user can control alpha channel values, source and destination rectangles for each input video stream.

There is a significant deficiency to this approach, beyond the simple issue that the performance of the compositing operation tends to be poor: DirectShow® requires that all input streams to the VMR9 be members of the same filter graph, and thus must all share the same stream clock. This sharing of the stream clock means that if several different video clips are all rendered to inputs on a single VMR9, and the filter graph is told to seek to 1:30 on its media timeline, each video clip will seek to 1:30. The same holds for playback rate; it is not possible to change the playback rate (for example, 70% of real-time) for one stream without changing it for all streams. Finally, one stream cannot be paused, stopped, or rewound independently of the others.

Suppose that a user wants to create an edited video that consists entirely of streaming video currently available on the Internet (or a private sub-network or local disk), while adding his own effects, transitions, and titles, and determining exactly which subsections of the original files he would like to include in the output. Such an operation is essentially impossible today: as described above, the user would need to obtain editable, local copies of each input video, then render the output frame-by-frame using a nonlinear video editor, and finally, compress it and re-stream it for delivery to his audience. Even if the compositing features of the existing VMR9 were leveraged to provide simple alpha blending, movement effects, and primitive transitions, the input videos would all still play on the same stream clock and thus the user would not have control over the timelines of the input videos with respect to the output video.

BRIEF SUMMARY OF THE DISCLOSURE

The present disclosure is directed to a system for video compositing, which is comprised of a storage device for storing a composite timeline file. A timeline manager reads rendering instructions and compositing instructions from the stored file. A plurality of filter graphs, each receiving one of a plurality of video streams, renders frames therefrom in response to the rendering instructions. 3D hardware is responsive to the rendered frames and the compositing instructions for creating a composite image. A frame scheduler is responsive to the plurality of filter graphs for controlling the frequency at which the 3D hardware creates a new composite image. An output is provided for displaying the composite image.

The present disclosure is also directed to a method for video compositing which is comprised of reading rendering instructions and compositing instructions from a timeline file, rendering frames from a plurality of video streams in response to the rendering instructions, creating a composite image from the rendered frames and the compositing instructions, controlling the frequency at which a new composite image is created in response to the rate at which rendering is occurring, and displaying the composite image.

The present disclosure is also directed to a method of creating a file of metadata, which can be used to generate a composite work on the fly on the client-side. The method is comprised of generating rendering instructions using metadata to identify one or more video segments from a plurality of video media streams, generating compositing instructions for controlling the presentation of video segments identified by the rendering instructions, and storing the rendering and compositing instructions.

The hardware-based, client-side, video compositing system of the present disclosure aggregates multiple media streams at a client host. The network streams could be stored locally or, more typically, originate from ordinary streaming media sources on the network. The result of the aggregation is an audio/visual presentation that is indistinguishable from a pre-compiled edited project, such as might be generated by traditional editors, such as Adobe Premier. However, a major difference is that the system of the present disclosure does not require the content creator of the composite work to have access to source materials in original archival form, such as high bit-rate digital video. Indeed, the content creator of the composite work can use any available media streams as source material.

BRIEF DESCRIPTION OF THE FIGURES

The present disclosure will now be described, for purposes of illustration and not limitation, in conjunction with the following figures wherein:

FIGS. 4A-4K represent a timing diagram helpful in understanding the operation of the video compositing system illustrated in FIG. 1.

DETAILED DESCRIPTION

Figure 1:
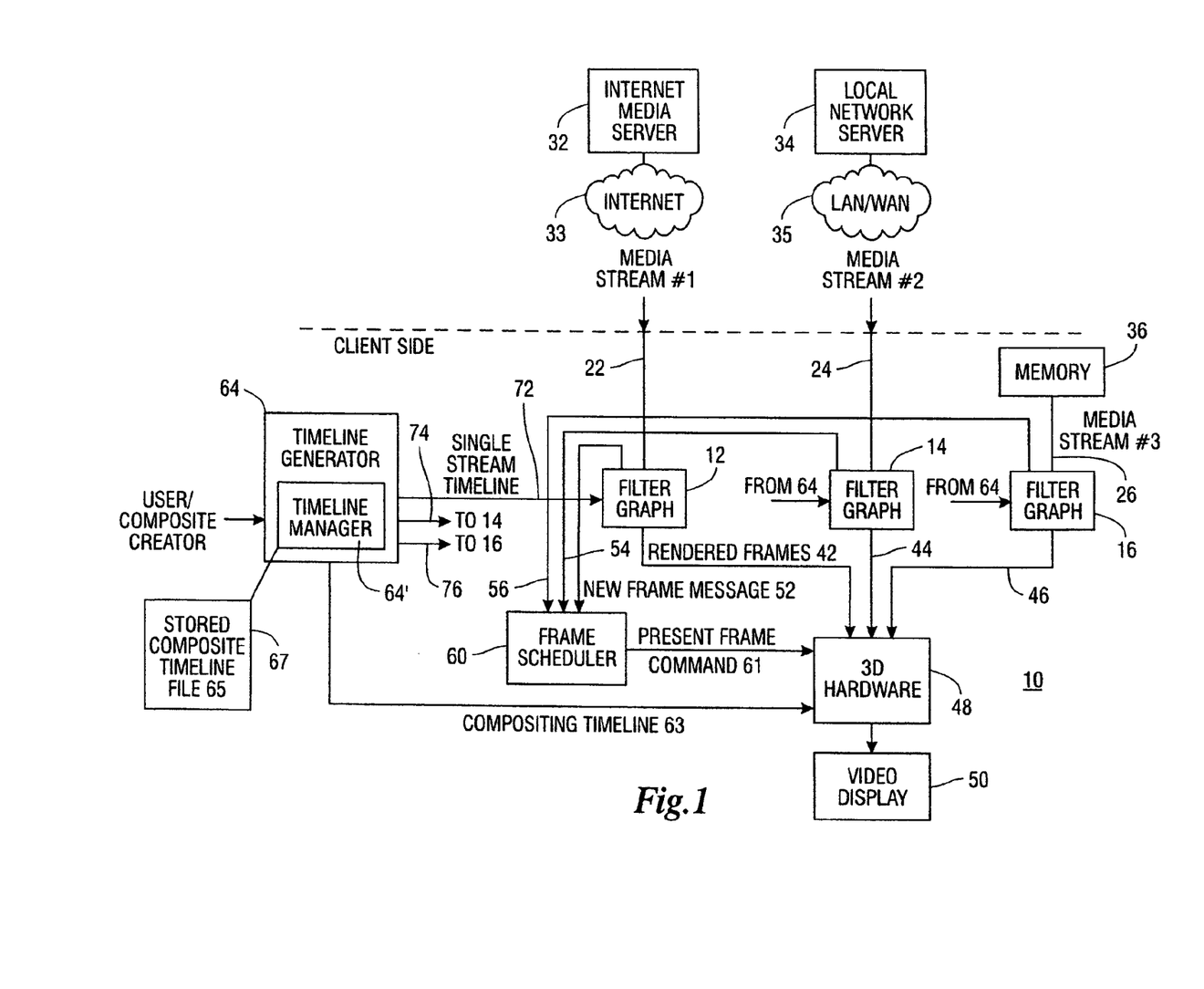
FIG. 1 is a block diagram of a hardware-based, client-side, video compositing system constructed according to the teachings of the present disclosure.

FIG. 1 is a block diagram of a hardware-based, client-side, video compositing system 10 constructed according to the teachings of the present disclosure. The system 10 is comprised of a plurality of filter graphs, three in this example (filter graphs 12, 14, 16) one for each of the media streams 22, 24, 26, respectively. In this example, the first media stream 22 is streaming video delivered from an Internet media server 32 via the Internet 33. The second media stream 24 is also streaming video delivered from a local network server 34 via a local area network or wide area network 35. The third media stream 26 is taken from a video file being read from a local memory device 36. In general, the media streams can be any media that is delivered in a time-based manner. That includes video streams such as Windows Media, MPEG streams, among others, audio streams, markup streams (e.g., ink, time stamped slide shows (Power Point, PDF, among others), etc.

The filter graphs 12, 14, 16 produce rendered frames 42, 44, 46 and new frame messages 52, 54, 56, respectively, as is discussed in detail below in conjunction with FIG. 2. The rendered frames are available to 3D hardware 48. The 3D hardware 48 is conventional hardware, such as nVidia GeForce™, ATI Radeon™, among others, which manages the mapping of off-screen surfaces to an on-screen composite work. The composite work could include any number of the media streams 22, 24, 26 arranged on a timeline according to user-generated instructions, as will be explained below. The on-screen composite work is displayed on a video display 50.

The new frame messages 52, 54, 56 are input to a frame scheduler 60. The frame scheduler 60 is a software component that sends a "present frame" command 61 to the thread managing the 3D hardware 48 whenever the frame scheduler receives one of the new frame messages 52, 54, 56. The "present frame" command 61 may take the form of a flag which, when set, causes the 3D hardware to refresh the composite work in the pixel buffer (not shown) of the video display 50 according to compositing instructions in compositing timeline 63. The frame scheduler may be implemented through a messaging loop, a queue of events tied to a high-precision counter, event handles, or any other sufficiently high-performance scheduling system. The basic purpose of the frame scheduler is to refresh the video image on the screen whenever any input video stream issues a new frame to any of the video renderers.

Figure 3:
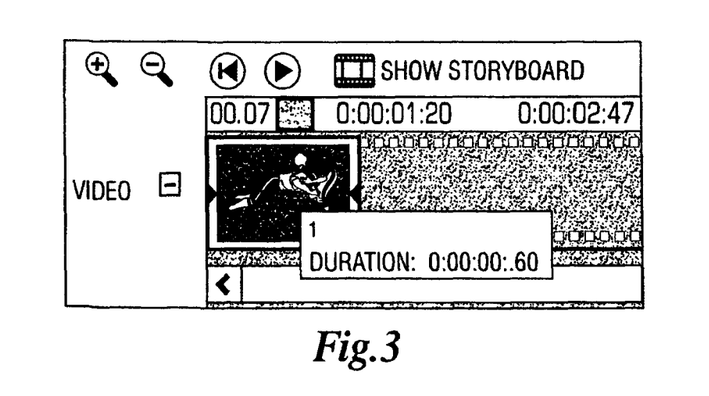
FIG. 3 is an example of a screen shot from a commercial, nonlinear editing system.

A compositing timeline generator 64 produces a compositing timeline file 65 which is stored in memory device 67. Generic video editing timeline generators are known in the art and include products, such as Adobe Premiere, Apple iMovie®, Microsoft Movie Maker, etc., a screen shot from one of which is shown in FIG. 3. Timelines generated by these products are used to create static, pre-rendered output files, as described earlier in this document, and are mentioned only to illustrate the source video subselection and type of effects, transitions, titles, etc. that might be included in a client-side compositing timeline. The compositing timeline generator 64 allows a user, which in this case is the creator of the composite work, to orchestrate when and how each of the media streams 22, 24, 26 will appear, if at all, in the composite work. The resulting set of instructions is the compositing timeline file 65 which is a computer-readable set of instructions that is used by a time line manager 64' to guide the creation of the composite work from the various media streams 22, 24, 26. The instructions can be meta-data that identify which segments of a media stream are to be part of the composite work, along with the intended time alignments and presentation rates of those segments within the composite work. The instructions can also identify transitions, text and other generated displays, or other information. The instructions can also identify synthetic content, such as effects (e.g., flipping, folding, morphing, among others), transitions (e.g., fade, alpha-blend, wrap, among others), rendered objects (e.g., locally generated text, titles, images, among others), etc. There may be multiple instructions for any given instant in the composite work. The compositing timeline file 65 may be thought of as a fast-memory representation of instructions that maps a single instant of an intended composite work to the instructions for generating the visual representation of that instant.

One example for achieving computer readability is to use an XML-based representation. There are many possibilities, and the present disclosure is not limited by the particular details of how the timeline might be represented. The content can include many kinds of instructions, as previously mentioned. Some examples for a particular media stream could include:

Start time within the media stream;
End time within the media stream;
Start time in the composite work;
End time for the composite; and
Speed-up or slow-down for the composite work relative to the pace of the media stream. This could also be inferred from the ratio of the relative durations of the media stream and composite work.

The following are some examples for transition effects from one media stream to another which can be implemented through appropriate instructions in the compositing timeline file 65. Some of these involve multiple streams appearing simultaneously in the composite work:

Dissolve, fade, and other effects for transition;
Picture-in-picture; and
Tiling.
Examples of effects within a media stream may include distortion, morphing, tessellation, and deformation, among other 3D-based effects.

The following are some examples of effects and displays based on non-stream input, which can be implemented through appropriate instructions in the compositing timeline file 65:

Title text, shapes, and other locally generated content displayed directly;
Locally generated content displayed as an overlay on media stream or other image; and
Animated title text or other locally generated content.

To illustrate what a compositing timeline file 65 might look like, an XML file is presented with some example instructions. This is not a comprehensive set of examples.

```
<compositeProject>
    <videoSegment>
        <name>Video 1</name>
        <id>1</id>
        <url>http://server.org/video1.asf</url>
        <inputStart>1:00</inputStart>
        <inputEnd>2:00</inputEnd>
        <outputStart>0:00</outputStart>
        <outputEnd>1:00</outputEnd>
    </videoSegment>
    <videoSegment>
        <name>Video 2</name>
        <id>2</id>
        <url>http://server.somewherelse.org/video2.asf</url>
        <inputStart>5:00</inputStart>
        <inputEnd>8:00</inputEnd>
        <outputStart>0:30</outputStart>
        <outputEnd>6:00</outputEnd>
    </videoSegment>
    <videoSegment>
        <name>Video 3</name>
        <id>3</id>
        <url>c:\mycomputer\video3.asf</url>
        <inputStart>0:00</inputStart>
        <inputEnd>0:30</inputEnd>
        <outputStart>5:00</outputStart>
        <outputEnd>6:00</outputEnd>
    </videoSegment>
    <transition>
        <startTime>0:30</startTime>
        <endTime>1:00</endTime>
        <startID>1</startID>
        <endID>2</endID>
        <type>DISSOLVE</type>
    </transition>
    <transition>
        <startTime>3:00</startTime>
        <endTime>6:00</endTime>
        <startID>2</startID>
        <endID>3</endID>
        <type>PIP</type>
    </transition>
    <effect>
        <startTime>2:00</startTime>
        <endTime>4:00</endTime>
        <effectType>SHIMMER</effectType>
        <targetID>ALL</targetID>
    </effect>
```

-continued

```
    <title>
        <startTime>0:00</startTime>
        <endTime>0:30</endTime>
        <titleType>SERIF30</titleType>
        <content>Our example!</content>
    </title>
</compositeProject>
```

Returning to FIG. 1, three, single, stream-specific timelines 72, 74, 76 are output from the global timeline manager 64' to the filter graphs 12, 14, 16, respectively. The global timeline manager 64' may be thought of as that part of the compositing code that reads the timeline file 65, then provides instructions and/or data to the various filter graphs 12, 14, 16 on which sections of the input streams should be played (and at what rates and time alignment, discussed below), and provides instructions to the code controlling the 3D hardware 48 about which of the video frames currently being rendered by the filter graphs should be combined and manipulated. The global timeline manager 64' is shown as part of the timeline generator 64 but could be implemented in stand-alone code.

The presentation rate is an adjustment made to the relative display speed of a media stream of a video file and the result that appears in the composite work. The time alignment is the correspondence of the start time of the timeline of a segment of video with a point in the overall timeline of the composite work.

Note that from only metadata, such as input video source and time code range, transition type and duration, title text and formatting information, etc., it is possible to construct the compositing timeline file 65 containing the information and instructions needed to generate the desired composite work. The composite work is generated in real time and within the 3D hardware 48 on the client system 10, rather than offline and pre-processed. There is no pre-existing copy of the composite work, as it is built on the fly. To regenerate the composite work, or to share it with others, only the small compositing timeline file 65 needs to be shared, and that can be easily accomplished by posting it on a web site or sending it via email.

Figure 2:
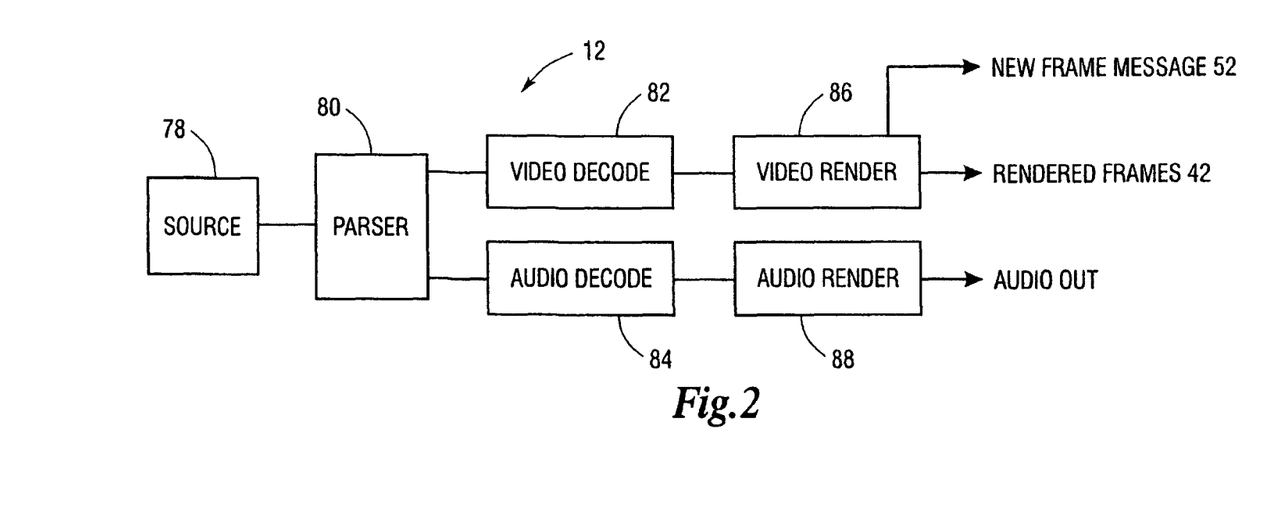
FIG. 2 is a block diagram of a filter graph of the type which may be used in the system of FIG. 1.

Turning now to FIG. 2, FIG. 2 is a block diagram of the filter graph 12. The reader will understand that the other filter graphs 14, 16 are similarly constructed. The filter graph 12 illustrated in FIG. 2 is a typical playback graph for an MPEG movie file. It is comprised of a source filter 78 for reading the data from a URL or a file. A parser filter 80 is responsive to the source filter 78 and separates out portions of audio and video data. An audio decoder 84 and a video decoder 82 are responsive to the audio and video portions, respectively, separated out by the parser filter 80. Finally, a video renderer 82 and an audio renderer 88 are responsive to the video decoder 82 and audio decoder 84, respectively. The video renderer 82 produces the rendered frames 42 and the new frame message 52.

As an example of an input stream, we can use an input stream that is a high-resolution video stream (e.g., HD) created from a stationary camera of a relatively large scene, such as the entire front of a classroom. The stationary camera allows for a high compression rate in the stream. We then use the disclosed compositing technique to present only a cropped portion of this large, high-resolution image, with the size and location of the cropped area changing according to the timeline instructions. This creates the appearance of a videographer palming, tilting, and zooming, even though in reality all this is done in the video hardware of the client on the basis of instructions possibly given well after the actual capture. In other words, it enables unattended video capture with a fixed high-resolution camera and after-the-fact "videography" that can be tailored to individual users.

Having described the components of the system 10 of FIG. 1, the operation of the system 10 will now be described. First, the compositing timeline file 65 is generated by identifying those frames and/or other time-based media elements that are to be displayed in the composite work. The composite timeline file 65 can be generated in a number of ways including a separate editor application, by hand, or by some other tool. The compositing timeline file 65 also contains the instructions (compositing timeline 63) that control the presentation of the composite work, i.e., fading, tiling, picture-in-picture, etc. Once the compositing timeline file 65 is created, it may then be stored for later use and/or shared with others. Note that because the compositing timeline file 65 contains information for identifying portions of media streams rather than the portions of the media streams themselves, the compositing timeline file is a small file compared to the size of the composite work.

The process of reading the stored compositing timeline file 65 and using it to assemble frames or other time-based media elements into a resulting time-based composite work displayed on video display 50 is called compositing. The composite work is created in real time, on the fly. Note that many publicly available video streams on the Internet can be used as raw material for the synthesis of composite works. No copy of the composite work exists before it is composited, and assuming the person viewing the composite work does not make a copy during the compositing process, the composite work may be viewed as ephemeral.

The compositing is accomplished by programming each video renderer 86 within the filter graphs 12, 14, 16 to create separate surfaces in graphics hardware for their respective media streams 22, 24, 26. The frame scheduler 60 receives notification via the new frame messages 52, 54, 56 each time any frame rendered within the filter graphs 12, 14, 16 updates its surface with a new frame of video. Upon receiving the notification, the frame scheduler 60 issues the present frame command 61 that causes the 3D graphics hardware 48 to draw a "scene" (3D rendered image) consisting of some or all surfaces containing video data from the various sources. Because this is an ordinary 3D scene, the drawing algorithms are limited only by the imagination of the application designer or creator of the editing project. Effects, transitions, titles, etc. can have arbitrary complexity and are limited by the performance of the 3D graphics hardware 48.

Figures 4A, 4B:
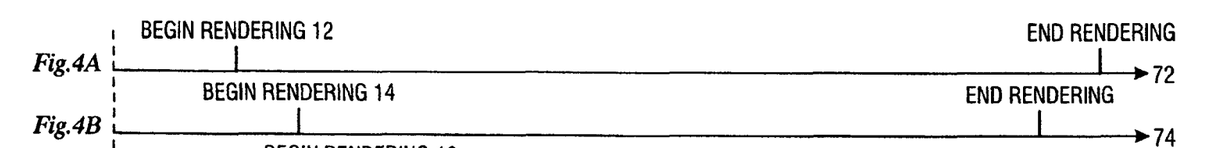
Figure 4C:
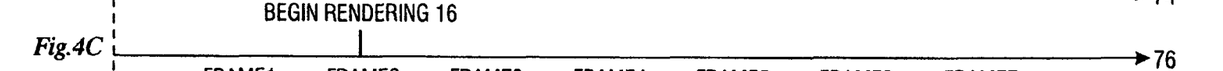
Figure 4D:
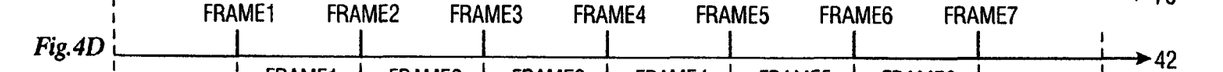

Turning now to FIGS. 4A-4K, those figures represent a timing diagram helpful in understanding the operation of the video compositing system 10 illustrated in FIG. 1. FIGS. 4A, 4B, and 4C represent timing diagrams of the single stream timelines 72, 74, 76, respectively. For example, in FIG. 4A, at time t1, a "begin rendering" instruction is issued to filter graph 12. As a result, as shown in FIG. 4D, filter graph 12 begins rendering frames 42 at times t1, t3, t5, t8, t11, t13, and t16. Thus, seven frames are rendered between the "begin rendering" instruction issued at t1 and the "end rendering" instruction issued at time t18 by the single stream timeline 72.

Figures 4E, 4F:
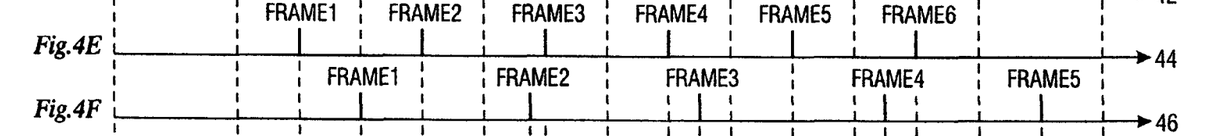

FIG. 4B illustrates a "begin rendering" instruction issued by the single stream timeline 74 illustrated in FIG. 4B at time t2. In response, and as shown in FIG. 4E, filter graph 14 renders frame 1 at t2, frame 2 at t4, frame 3 at t7, frame 4 at t9, frame 5 at t12, and frame 6 at t15. Thus, from the time the "begin rendering" instruction is issued to filter graph 14, until the time that the "end rendering" instruction is issued to filter graph 14, filter graph 14 produces six frames. The frames produced by filter graph 14 are produced at the same rate as the frames produced by filter graph 12. However, the frames produced by filter graph 14 are offset time wise from the frames produced by filter graph 12.

Finally, filter graph 16 produces five frames as shown in FIG. 4F in response to the single stream timeline 76 illustrated in FIG. 4C. The frames produced by filter graph 16 are not produced at the same rate as are the frames produced by filter graphs 12 and 14, and are also offset time wise from the production of those frames.

The filter graphs 12, 14, 16 can be seeked in advance (cued in anticipation of its start time) to any point in the media stream's 22, 24, 26 timeline based on instructions in the stream-specific timelines 72, 74, 76, respectively, and playback will begin virtually instantly. The video file does not have to be downloaded up to the desired point for playback to start. At playback time, as the clock approaches the time of each transition in the stream-specific timeline 72, 74, 76, the desired video clip is simply seeked using the technique above, then paused (with several frames already queued) until it is time for it to begin playing. That results in seamless transitions between streaming videos hosted on completely independent servers. Additionally, multiple connections can be made to the same video stream thereby allowing rapid cutting, overlap, etc.

Figures 4G, 4H, 4I, 4J:
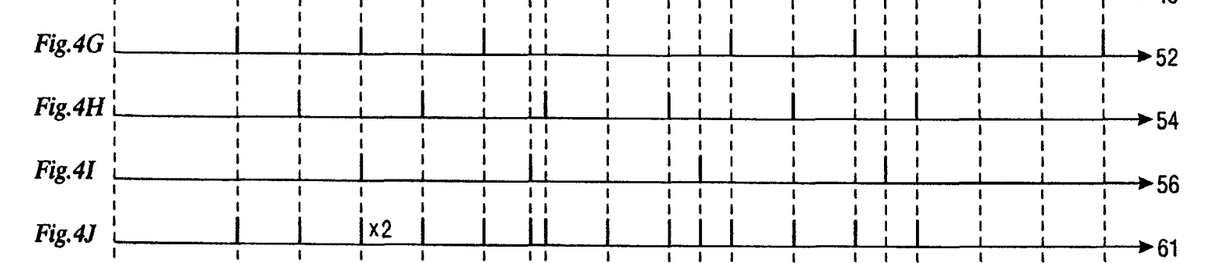

FIGS. 4G, 4H, and 4I illustrate the new frame message 52, 54, 56, respectively. Thus, each time a frame is rendered in FIG. 4D, a new frame message 52 signal is generated as shown in FIG. 4G. Similarly, each time a frame 44 is rendered by filter graph 14 as shown in FIG. 4E, a new frame message 54 is generated as shown in FIG. 4H. Finally, each time a new frame 46 is rendered by filter graph 16 as shown in FIG. 4F, a new frame message 56 is generated as shown in FIG. 4I. FIG. 4J, which illustrates the present frame command 61, can be seen to be a composite of the signals 52, 54, 56. Thus, each time a frame is rendered by one of the filter graphs 12, 14, 16, a new frame message 52, 54, 56 is generated, respectively, and aggregated into the present frame command 61 as shown in FIGS. 4D-4J. As previously stated, the present frame command 61 is input into the 3D hardware 48 to cause a recreation of the image to be displayed on video display 50. That recreation is based on the new frames, which are presented, as well as the composite timeline 63, which is illustrated in FIG. 4J.

Figure 4K:
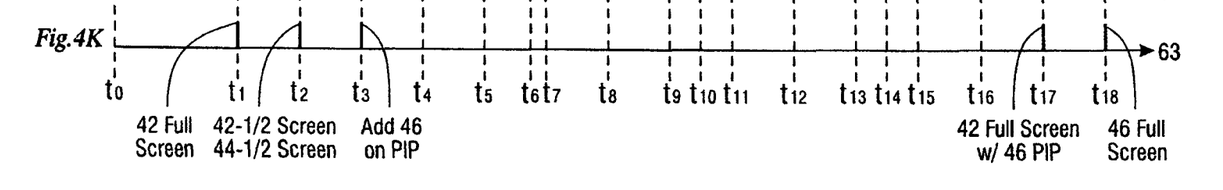

Turning now to FIG. 4K, sample instructions which may be part of the composite timeline 63 are illustrated. For example, at time t1 the frame 42 rendered by the filter graph 12 is displayed full screen on video display 50. At time t2, when frame 44 rendered by filter graph 14 is available, the frames 42 and 44 each share one-half of the screen of the video display 50. At time t3, when frame 2 from the rendered frames 42 is available, and frame 1 from the rendered frames 46 is available, the new frame 42 is displayed on its one-half of the screen, and frame 1 from rendered frame 46 is added as a picture-in-picture. That display continues until time t17, at which time the filter graph 14 is instructed to end rendering. At that point, the frame rendered by filter graph 12 is displayed full screen, while the frame rendered by filter graph 16 remains as a picture-in-picture. At time t18, when filter graph 12 is instructed to end rendering, the frame rendered by the filter graph 16 is displayed full screen.

Because each source video in this system has its own filter graph, all of the problems mentioned in connection with the prior art related to common clocks are eliminated. With respect to differing frame rates, the compositing of the present disclosure involves using the local 3D hardware 48 to redraw the entire output video frame each time a source video renderer 78 issues a new frame message 52, 54, 56 to the frame scheduler 60 (up to the maximum refresh rate of the output device). So, if one video stream were 24 fps and another were 30 fps, with a monitor refresh rate of 60 Hz, the output video would update a maximum of 60 times per second.

Finally, all problems relating to different input resolutions and color spaces are eliminated. Resolving these discrepancies is a primary reason for the complexity of traditional non-linear editing systems; when each video is first rendered into a hardware 3D surface before being drawn, the process of resolving the differences in resolution and color space becomes as simple as instructing the 3D hardware to draw a polygon to the desired region of the screen.

Using the system 10 described above, it is possible to create an editing software (e.g., timeline generator 64) that generates project files (e.g., compositing timeline files 65) composed entirely of metadata but that can be played as easily as normal video files. One can also create a player (e.g., timeline manager 64') that interprets the compositing timeline files 65 by playing the series of remotely hosted streaming video clips, potentially on different timelines and at different rates, and performs all of the specified compositing by simply drawing the video frames as desired by the project creator.

While the present invention has been described in conjunction with preferred embodiments thereof, those of ordinary skill in the art will recognize that many modifications and variations are possible. Those of ordinary skill in the art will recognize that various components disclosed herein (e.g., the filter graphs, frame scheduler, timeline generator, etc.) may be implemented in software and stored on a computer readable storage medium. Other implementations may include firmware, dedicated hardware, or combinations of the above. All such modifications and variations are intended to be covered by the following claims.

What is claimed is:

1. A system for video compositing, comprising:
    a storage device for storing a composite timeline file;
    a timeline manager responsive to said stored timeline file for reading rendering instructions and compositing instructions, wherein the timeline file identifies a particular period of time when data from a first video stream and data from a second video stream are to be displayed simultaneously;
    a plurality of filter graphs, each for receiving one of a plurality of video streams and for rendering frames therefrom in response to said rendering instructions, wherein each filter graph transmits a frame ready signal when that filter graph renders a new frame, wherein the filter graphs include a first filter graph associated with the first video stream and a second filter graph associated with the second video stream;
    3D hardware responsive to said rendered frames and said compositing instructions for creating a composite image; and
    a frame scheduler responsive to said plurality of filter graphs for controlling the frequency at which said 3D hardware creates a new composite image, wherein, during the particular period, the frame scheduler is configured to command the 3D hardware to create a new composite image whenever the first filter graph or the second filter graph transmits a frame ready signal.

2. The system of claim 1, wherein said plurality of filter graphs each comprises a software source filter, a parser, a video decoder, and a video renderer.

3. The system of claim 1, wherein said rendering instructions identified by said timeline manager include rendering instructions for identifying portions of video streams to be rendered, and rendering rates.

4. The system of claim 1, wherein said compositing instructions identified by said timeline manager include compositing instructions for one of combining and manipulating said rendered frames.

5. The system of claim 1 additionally comprising a timeline generator for generating a timeline file, said storage device responsive to said timeline generator.

6. A system for video compositing, comprising:
    a storage device for storing a composite timeline file;
    a timeline manager for reading said stored timeline file to identify rendering instructions and compositing instructions, wherein the timeline file identifies a particular period of time when data from a first video stream and data from a second video stream are to be displayed simultaneously;
    a plurality of software filter graphs, each having a rendering module for receiving one of a plurality of video streams and for rendering frames therefrom in response to said rendering instructions, wherein each filter graph transmits a frame ready signal when that filter graph renders a new frame, wherein the filter graphs include a first filter graph associated with the first video stream and a second filter graph associated with the second video stream;
    3D hardware responsive to said plurality of filter graphs and said time line manager for creating a composite image in response to rendered frames and compositing instructions, respectively; and
    a frame scheduler responsive to said plurality of filter graphs for commanding said 3D hardware to create a new composite image when any of said filter graphs renders a new frame, wherein, during the particular period, the frame scheduler is configured to command the 3D hardware to create a new composite image whenever the first filter graph or the second filter graph transmits a frame ready signal.

7. The system of claim 6, wherein said plurality of filter graphs each comprises a software source filter, a parser, and a video decoder.

8. The system of claim 6, wherein said rendering instructions identified by said timeline manager include rendering instructions for identifying portions of video streams to be rendered, and rendering rates.

9. The system of claim 6, wherein said compositing instructions identified by said timeline manager include compositing instructions for one of combining and manipulating said rendered frames.

10. The system of claim 6 additionally comprising a timeline generator for generating a timeline file, said storage device responsive to said timeline generator.

11. A method for video compositing, comprising:
    reading rendering instructions and compositing instructions from a timeline file, wherein the timeline file identifies a particular period of time when data from a first video stream and data from a second video stream are to be displayed simultaneously;
    rendering frames from a plurality of video streams in response to said rendering instructions, wherein a frame ready signal is transmitted by one of a plurality of filter graphs when a new frame from any of the video streams is rendered, wherein a first filter graphs is associated with the first video stream and a second filter graph is associated with the second video stream;
    creating a composite image from said rendered frames and said compositing instructions; and
    controlling the frequency at which a new composite image is created in response to said rendering, wherein, during the particular period, a new composite image is created whenever the first filter graph or the second filter graph transmits a frame ready signal.

12. The method of claim 11, wherein said rendering frames in response to rendering instructions includes rendering frames from rendering instructions for identifying portions of video streams to be rendered, and rendering rates.

13. The method of claim 11, wherein said creating a composite image from said compositing instructions includes creating a composite image from compositing instructions for one of combining and manipulating said rendered frames.

14. The method of claim 11 additionally comprising generating said timeline file.

15. A computer readable memory device, carrying a set of instructions which, when executed, performs a method comprising:

reading rendering instructions and compositing instructions from a timeline file, wherein the timeline file identifies a particular period of time when data from a first video stream and data from a second video stream are to be displayed simultaneously;

rendering frames from a plurality of video streams in response to said rendering instructions, wherein a frame ready signal is transmitted by one of a plurality of filter graphs when a new frame from any of the video streams is rendered, wherein a first filter graphs is associated with the first video stream and a second filter graph is associated with the second video stream;

creating a composite image from said rendered frames and said compositing instructions; and controlling the frequency at which a new composite image is created in response to said rendering, wherein, during the particular period, a new composite image is created whenever the first filter graph or the second filter graph transmits a frame ready signal.

* * * * *

UNITED STATES PATENT AND TRADEMARK OFFICE
CERTIFICATE OF CORRECTION

| | | |
|---|---|---|
| PATENT NO. | : 8,948,572 B2 | Page 1 of 1 |
| APPLICATION NO. | : 13/667654 | |
| DATED | : February 3, 2015 | |
| INVENTOR(S) | : Scherlis et al. | |

It is certified that error appears in the above-identified patent and that said Letters Patent is hereby corrected as shown below:

On the Title Page, item [54] and in the Specification, col. 1, line 4, delete "Frame Schedular" and insert -- Frame Scheduler --.

Signed and Sealed this
Fifth Day of May, 2015

Michelle K. Lee
*Director of the United States Patent and Trademark Office*